(12) United States Patent
Edwards et al.

(10) Patent No.: US 7,741,841 B2
(45) Date of Patent: Jun. 22, 2010

(54) TIME-LAPSED DIFFUSIVITY LOGGING FOR MONITORING ENHANCED OIL RECOVERY

(75) Inventors: John Edwards, Mediant Al Alam (OM); Hemant K. J. Ladva, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 328 days.

(21) Appl. No.: 11/966,551

(22) Filed: Dec. 28, 2007

(65) Prior Publication Data
US 2009/0167302 A1    Jul. 2, 2009

(51) Int. Cl.
*G01V 3/00*    (2006.01)

(52) U.S. Cl. .................................. 324/303; 324/306

(58) Field of Classification Search .............. 324/303, 324/306
See application file for complete search history.

(56) References Cited

U.S. PATENT DOCUMENTS

| | | | |
|---|---|---|---|
| 5,213,379 A | | 5/1993 | Taniguchi et al. |
| 5,214,384 A | * | 5/1993 | Sprunt et al. ................. 324/351 |
| 5,486,762 A | * | 1/1996 | Freedman et al. ........... 324/303 |
| 5,524,708 A | | 6/1996 | Isaacs |
| 5,696,448 A | | 12/1997 | Coates et al. |
| 5,796,252 A | | 8/1998 | Kleinberg et al. |
| 6,140,818 A | | 10/2000 | Hurlimann |
| 2006/0122779 A1 | | 6/2006 | Minh et al. |
| 2009/0302852 A1 | * | 12/2009 | Levesque et al. ............ 324/338 |

OTHER PUBLICATIONS

Lo et al., Correlations of NMR Relaxation Time with Viscosity, Diffusivity, and Gas/Oil Ratio of Methane/Hydrocardon Mixtures, SPE 63217.
Heaton et al., Applications of a New-Generation NMR Wireline Logging Tool, SPE 77400.

* cited by examiner

*Primary Examiner*—Louis M Arana
(74) *Attorney, Agent, or Firm*—Darla Fonseca; Brigitte Echols; Charlotte Rutherford

(57) ABSTRACT

The use of time-lapsed NMR diffusivity measurements in an observation well is disclosed. The observation well is cased in the zone of interest with non-magnetic and non-conductive casing that is invisible to the NMR tool. Second, because NMR measurements have a dead zone in front of the antenna depending on the spatial variation of the fixed magnet strength, for example about 2.7 inches, a distance between the casing and the formation is reduced to less than the dead zone length by drilling the observation well at small deviation of about 5° and running the casing without centralizers. Both the casing and the pad-type NMR tool will follow the low side of the borehole, ensuring the measurement volume of the NMR tool is inside the formation and beyond the annulus. With the appropriate observation well completion, time-lapse diffusivity measurements with pad-type NMR tools can address several shortcomings in the current practice of monitoring EOR processes that rely upon changes in density and hydrogen index (HI). Various uses of NMR imaging in wells cased with non-metallic casing are also disclosed.

13 Claims, 3 Drawing Sheets

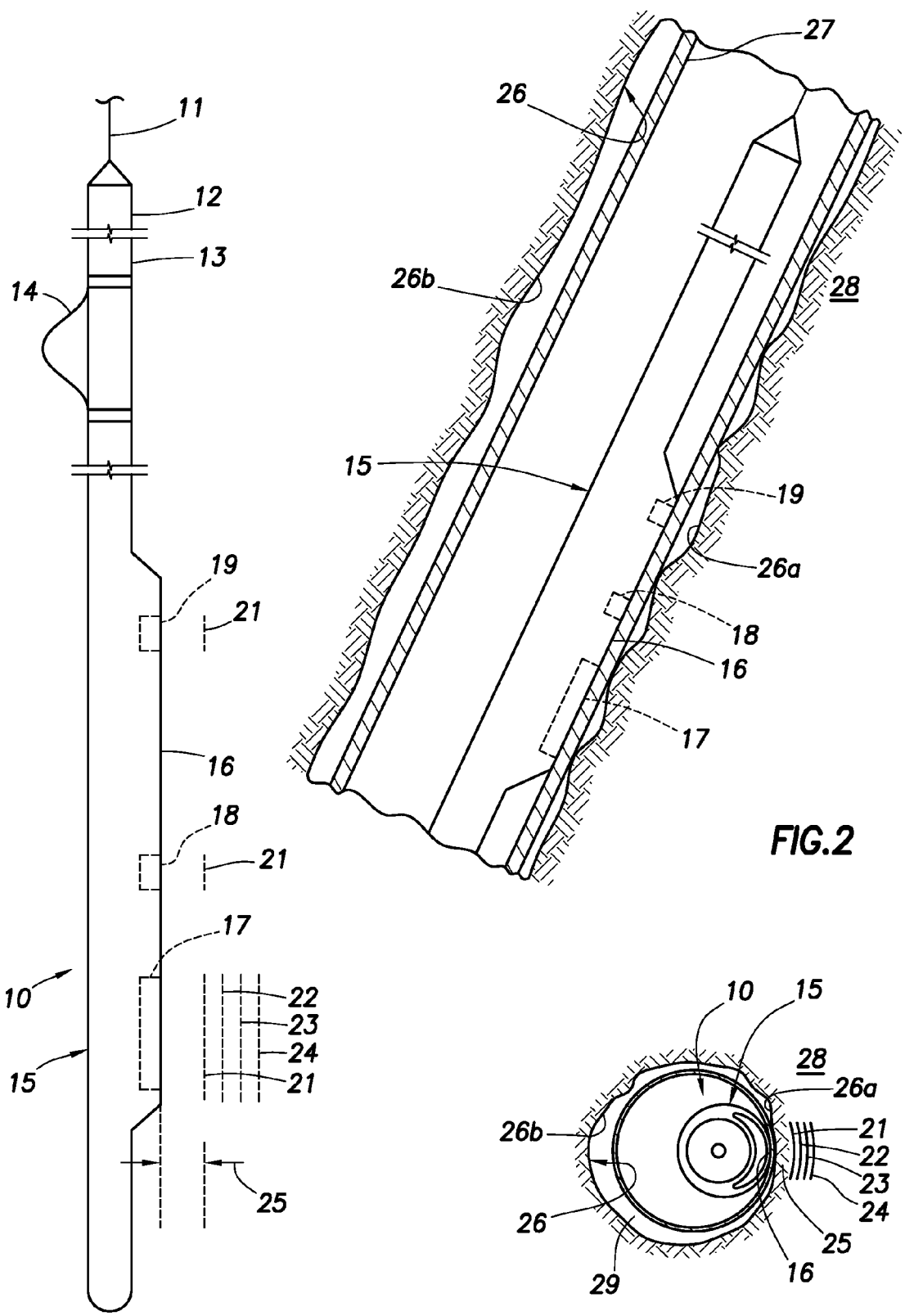
FIG.1
FIG.2
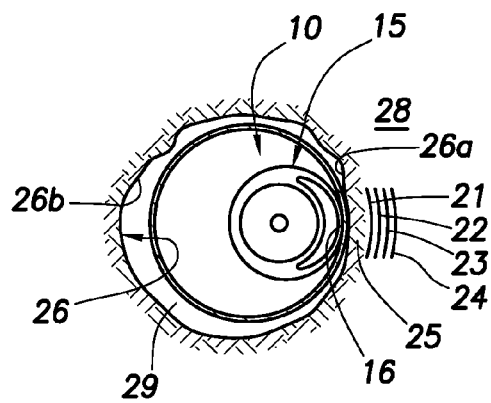
FIG.3

TIME-LAPSED DIFFUSIVITY LOGGING FOR MONITORING ENHANCED OIL RECOVERY

BACKGROUND

1. Technical Field

New techniques are disclosed that employ nuclear magnetic resonance (NMR) logging tools to measure time-lapse diffusivity in an observation well of a reservoir undergoing enhance oil recovery (EOR). More specifically, techniques are disclosed which eliminate problems associated with changes in fluid or poor cement bond in the annulus between the well casing the formation which render NMR logs ineffective. The techniques include drilling a deviated observation borehole and using non-magnetic, non-conductive casing without centralizers in the zone of interest thereby ensuring that the casing rests against the formation on the low side of the deviated borehole. The zone of interest is logged with an NMR tool with the pad directed radially at the portion of the casing that rests against the low side of the borehole ensuring that the shallowest zone of interest lies in the formation and not the annulus. Other cased-hole NMR imaging/logging techniques include logging behind completion hardware (casing, sand control screen, etc.) that is non-conductive and non-magnetic for evaluating cement and sand control operations.

2. Description of the Related Art

The development of an oil field or reservoir may include three stages known as primary, secondary and tertiary recoveries. Primary recovery produces oil and gas using the natural pressure of the reservoir as the driving force to push the oil to the surface. Wells are often "stimulated" through the injection of fluids, which fracture the hydrocarbon-bearing formation to improve the flow of oil and gas from the reservoir to the wellhead. Other techniques, such as pumping and gas lift help production when the reservoir pressure dissipates.

Secondary recovery uses other mechanisms, such as gas reinjection and water flooding, to produce residual oil and gas remaining after the primary recovery phase. Tertiary recovery involves injecting of other gases (such as carbon dioxide), heat (steam or hot water), or chemicals to stimulate oil and gas flow to produce remaining residual fluids that were not extracted during primary or secondary recovery phases.

Enhanced oil recovery (EOR) is a type of tertiary recovery. Gas injection is the most common form of EOR and involves the injection of a carbon dioxide ($CO_2$), natural gas, or nitrogen, into the reservoir through an injection well whereupon the gas expands and pushes additional oil to a production wellbore. The injected gas is preferably miscible in the oil to lower the viscosity and improve the flow rate of the oil. Another type of EOR is thermal recovery, which uses heat to improve oil flow rates. Chemical injection is yet another type of EOR where polymers are injected to increase the effectiveness of water floods, or the use of detergent-like surfactants (e.g., alkaline surfactant polymers or ASP) are injected to help lower the surface tension that often prevents oil droplets from moving through a reservoir.

During EOR, it is common to monitor the water saturation changes from an observation well positioned some distance from the injector wells. Water saturation levels are relatively easy to monitor with conventional logging tools, such as induction, pulsed neutron or thermal neutron tools. However, some EOR processes do not involve any changes in water saturation, unlike primary and secondary recoveries where recovered oil is naturally replaced in the reservoir by water. Specifically, when the reservoir is injected with gas in a "miscible gas flood" operation, recovered oil is not predominately replaced by formation water, and therefore current reservoir monitoring techniques that measure the changes in water saturation to calculate the displacement of oil will be ineffective. For example, thermal neutron-emitting tools that measure changes in capture cross section, induction tools that measure conductivity or pulsed neutron tools that measure carbon/oxygen ratio are ineffective when the water saturation level does not appreciably change.

Thus, EOR processes that do not involve changes in water saturation include miscible gas floods and gas-oil gravity drainage projects. Monitoring these gas-based EOR processes requires a direct measure of in-situ oil de-saturation from within an observation well. There are several physical properties of oil and gases used in EOR that can be used to distinguish residual oil from the injected gas, including density differences and differences in hydrogen index (HI—the number of hydrogen atoms per unit volume divided by the number of hydrogen atoms per unit volume of pure water). Gamma-gamma density logs and neutron porosity logs can be used to measure the changes in density and HI respectively, giving a time-lapse measure of oil de-saturation. However, reliance upon changes in HI loses effectiveness if there is little difference in density and HI between the oil and gas. This can occur in miscible gas projects in which the gas properties and gas injection pressures are selected to enhance miscibility. Consequently, another physical parameter distinguishing oil and gas must be measured to calculate the oil de-saturation.

One possible parameter is diffusivity or diffusion coefficient, which refers to the motion of atoms in a gaseous or liquid state due to their thermal energy. Because diffusivity D ($m^2/s$) is dependent on the pore sizes of the formation and well as the fluid in the formation, diffusivity can be used as a gas and oil saturation indicator in addition to a permeability indicator. NMR imaging can provide a good measure of diffusivity. In a uniform magnetic field, diffusivity has little effect on the decay rate of the measured NMR echoes. In a gradient magnetic field, diffusion causes atoms to move from their original positions to new ones, which causes these atoms to acquire different phase shifts compared to atoms that did not move, and will thus contribute to a faster rate of relaxation. Therefore, in a gradient magnetic field, diffusivity is an NMR logging parameter which can provide independent information about the fluids in the formation (e.g., gas and oil saturation) and the structure of the formation. Thus, time-lapse diffusivity measurements of cased observation wells would provide important information about changes in formation fluids over the course of an EOR operation.

Currently, NMR imaging is used routinely in open holes because of its ability to record a real time permeability and porosity log that characterizes the near wellbore region (up to 4" of depth of investigation). NMR logs are used to predict production rates and assist in the planning of completion and stimulation operations. As noted above, NMR tools can be used to measure diffusivity as well as HI.

However, NMR tools are not being used during completion, production and monitoring of wells because typical metallic completion hardware attenuates the pulsed radio frequency signals used during NMR imaging. Further, in a cased hole, an NMR tool would be ineffective in measuring diffusivity if the cement bond between the casing and formation is poor and/or fluid is disposed in the annulus between the casing and formation. Specifically, a poor cement bond between the casing and formation results in areas of the annulus where voids in the cement are present. Borehole fluid fills these voids, which will change over time from, for example, oil to water. In this case, fluid changes in annulus will completely dominate the time-lapse response of any shallow reading log measurement, such as an NMR log. Measurements made by current NMR tools may not extend beyond the annulus is the annulus exceeds three inches or more in the zone of interest.

Accordingly, while a time-based measure of diffusivity could be used to monitor a miscible gas EOR project, problems associated with the use of NMR tools in cased holes must be overcome. Further, if such problems are overcome, NMR tools could also be used in other cased hole operations.

SUMMARY OF THE DISCLOSURE

One embodiment of the invention includes a method of determining a nuclear magnetic resonance (NMR) property of a formation, comprising providing a borehole, at least a portion of which is cased with non-magnetic and non-conductive casing, passing through the formation; disposing a NMR tool in the borehole; generating a series of NMR measurements along the borehole; and determining the NMR property using the series of NMR measurements.

The method further comprises using the determined NMR property to perform at least one task selected from the group consisting of monitoring a setting up of cement; determining a mud displacement efficiency; detecting a micro annulus between the casing and the cement; detecting a micro annulus between the cement and the formation; detecting a fluid composition at a casing-cement interface; detecting a fluid composition at a cement-formation interface; determining a presence of mud cake on a borehole wall; determining cement porosity; determining cement permeability; measuring formation porosity; measuring formation permeability; measuring oil saturation; and measuring water saturation.

A further embodiment method of determining a nuclear magnetic resonance (NMR) property of a formation, comprising providing a borehole passing through the formation; disposing a NMR tool in the borehole; generating a first series of NMR measurements along the borehole; waiting for a selected period of time; generating a second series of NMR measurements along the borehole; determining the NMR property using the first series of NMR measurements; and determining the NMR property using the second series of NMR measurements.

A method of determining a nuclear magnetic resonance (NMR) property of a formation, comprising providing a borehole, at least a portion of which is cased with non-magnetic and non-conductive casing, passing through the formation, wherein the non-magnetic and non-conductive casing is eccentered in the borehole; disposing a NMR tool in the borehole; generating a first series of NMR measurements along the borehole; waiting for a selected period of time; generating a second series of NMR measurements along the borehole; determining the NMR property using the first series of NMR measurements; and determining the NMR property using the second series of NMR measurements Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 1 is a partial elevational view of a pad-type NMR tool used with the disclosed methods of generating time-lapse diffusivity logs of observation wells in accordance with this disclosure;

FIG. 2 is a partial sectional view of a cased observation well and pad-type NMR tool being used in accordance with the disclosed methods;

FIG. 3 is a sectional view of the observational well, casing and pad-type NMR tool shown in FIG. 2;

Figure 4:
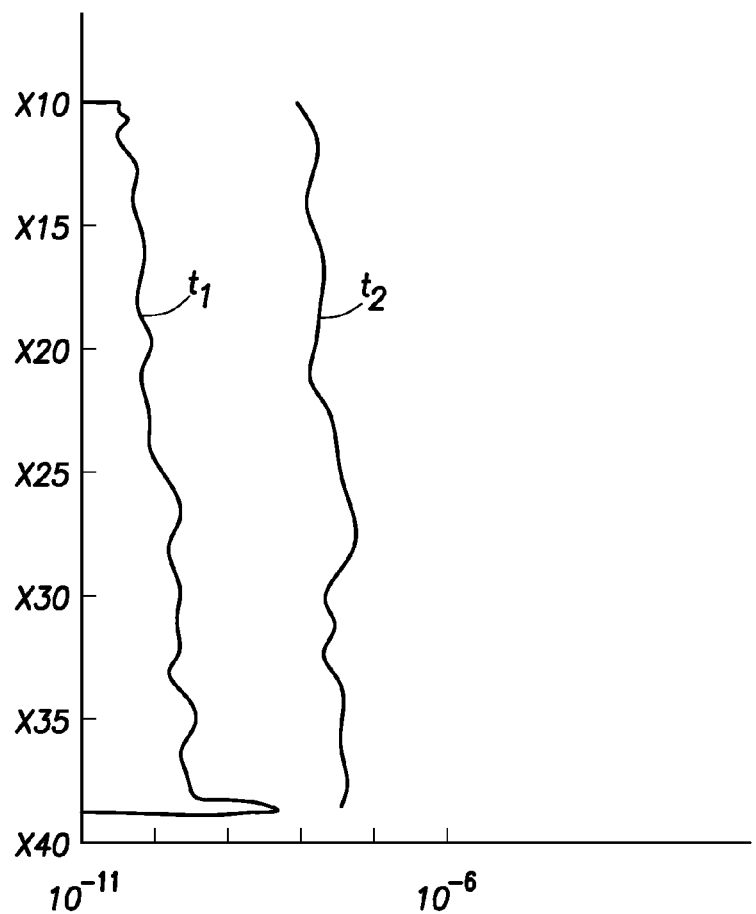
FIG. 4 is a time-lapse diffusivity log made in accordance with the disclosed methods.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

The use of nuclear magnetic resonance (NMR) imaging behind eccentered, non-conventional casing for measuring diffusivity and changes in various fluid saturations is disclosed. The casing should be non-conductive and non-magnetic and therefore preferably non-metallic. NMR tools are normally designed to run in open holes and not cased holes because the conventional steel casing used in a cased hole is conductive and strongly attenuates the pulsed radio frequency used in NMR measurements. Currently the non-conventional casings made of fiberglass and/or reinforced epoxy or other resins are used in wells where there is an issue of corrosion from $CO_2$, $H_2S$ and formation brine. The combined use of NMR and a decentralized, non-magnetic and non-conductive casing will allow investigation beyond the annulus.

Nuclear magnetic resonance (NMR) tools measure both diffusivity and HI. Therefore, for the reasons set forth above, in certain circumstances and particularly when evaluating a reservoir undergoing certain types of EOR, a time-lapse NMR measurement of diffusivity can be superior to time-lapse density or neutron logs. For example, miscible gas floods are designed to reduce the viscosity of the reservoir fluids, as well as maintain the pressure. Therefore, a measure of diffusivity could have an added benefit, enabling a more accurate measure of the effectiveness of viscosity reduction.

Polymer or alkaline surfactant polymer (ASP) floods may also benefit from time-lapse NMR diffusivity logs. In this case, the water diffusivity will decrease and the gas/oil saturation will increase with the arrival of the ASP front as the increased viscosity of the ASP flood front sweeps oil from the reservoir matrix. Both water diffusivity and gas/oil saturation can be determined from the diffusion/relaxation map or calculated using various means as set forth in U.S. Publication No. 2006/0122779, U.S. Pat. Nos. 6,140,818, 5,796,252, 5,696,448, Lo et al., "Correlation of NMR Relaxation Time with Viscosity, Diffusivity and Gas/Oil Ratio of Methane/Hydrocarbon Mixtures," SPE (Society of Petroleum Engineers) Paper No. 63217 (2000), Heaton, et al., "Applications of a New-Generation NMR Wireline Logging Tool," SPE Paper No. 77400 (2002), all of which are incorporated herein by reference.

The casing in the zone of interest should be invisible to the NMR signal, therefore non-conductive and non-magnetic, such as a plastic casing or fiber-reinforced plastic casing. Filament-wound resin casings or other types of resins reinforced with a variety of fibers can be used. Glass, carbon, basalt, metal and ceramic filaments and/or fibers may be used to reinforce a resin such as epoxy, polyester, vinyl ester or other types of resins. Single layer or multiple layer structures may be employed.

Time-lapse diffusion/relaxation maps in an observation well in the path of an ASP front or miscible gas front could be used to determine the in-situ relationship between viscosity increase and gas/oil saturation decrease, the most critical aspect of an EOR process.

Environmental corrections exist for nuclear logs recorded in cased holes such as observation wells, but these known corrections cannot correct for an unknown fluid or changes in the borehole fluid in the annulus between the casing and the formation. Therefore, NMR logs in a cased observation well are compromised if the cementation is poor. This is often the case when the reservoir is low pressured, has low strength or is fractured. The disclosed methods exploit the dead zone in front of an NMR tool antenna (~2.7 in.) by employing a non-vertical observation well, with uncentralized casing that engages or rests against the low side of the borehole, and by employing a pad-type NMR tool so the pad with the antennas will follow the low side of the casing and borehole. Therefore, the ideal time-lapse measurements provided herein are insensitive to the shallow zone immediately surrounding the observation well casing. As a result, the distance between the casing and the borehole in at the low side of the borehole can be reduced to less than the NMR dead zone of about 2.7 inched by (a) drilling a deviated borehole and (b) casing at least the zone of interest without centralizers, and (c) logging in the azimuth of the low side of the borehole by employing a pad-type NMR tool or an NMR tool with a center of gravity that will follow the low side of the deviated borehole.

Therefore, in an embodiment, the observation well is drilled at small deviation of about 5° and the casing is run without centralizers. Both the casing and a pad-type NMR tool will follow the low side of the borehole, ensuring the measurement volume of the NMR tool is inside the formation and radially beyond the casing and annulus. Using a deviated observation well, cased with non-magnetic and non-conductive pipe, and a pad-type NMR tool, time-lapsed diffusion logs can be obtained that enhance monitoring of EOR processes. The diffusivity measurements and time-lapse diffusivity logs of observation wells can be used to quantify the oil de-saturation with gas in miscible gas floods, or determine the in-situ relationship between water viscosity increase and oil saturation decrease caused by an ASP front.

One disclosed method of measuring diffusivity of a reservoir comprises: drilling a non-vertical observation borehole through the reservoir wherein the borehole comprises a circumferential low side, casing the observation borehole with non-magnetic and non-conductive casing in the reservoir and causing the casing to lie against the low side of the borehole, passing a nuclear magnetic resonance (NMR) tool through the reservoir wherein the NMR tool comprises a plurality of circumferentially aligned and longitudinally spaced-apart antennas and wherein the antennas are aligned with the low side of the borehole, and generating a series of first diffusivity (D) values along a portion of the borehole passing through of the reservoir.

In a refinement, the generating of the first diffusivity values comprises: measuring at least one of spin-lattice relaxation time ($T_1$) and spin-spin relaxation time ($T_2$) along the portion of the borehole passing through the reservoir, and calculating the first D values from at least one of the $T_1$ and $T_2$ measurements.

In a further refinement of this concept, $T_2$ processing of NMR data is preferred because it provides an independent measure of oil and gas saturation, not just oil saturation. Specifically, the diffusion coefficient D of each crude component depends on the mean chain length of the whole mixture, which will typically correlate with viscosity, and on the chain length of the particular component. The higher the overall mixture viscosity, the smaller the diffusion coefficients of all components of the mixture. Further, the longer the chain length of the component, the smaller the diffusion coefficient. Therefore, a large molecule will diffuse more slowly than a small molecule when placed in the same solvent. Similarly, a methane molecule dissolved in a low viscosity solvent or free methane will have a higher diffusion coefficient than a methane molecule dissolved in crude. Because $T_2$ inversely-correlates with viscosity, the $T_2$ of free methane gas will be much longer than the $T_2$ of methane dissolved in crude. As a result, it is possible to measure the saturations of free and dissolved gas states independently, which has direct applications for miscible gas flood monitoring. For example, free gas typically follows behind a bank of miscible gas and this change in D can be detected using the disclosed NMR logging techniques. Further, the disclosed NMR logging technique repeated in an observation well near an injector can be used to determine the arrival time and width of the miscible gas bank, the associated oil de-saturation, and the further oil de-saturation that may occur in the free gas.

In another refinement, the method further comprises: plotting the first D values versus depth to provide a first D log of the portion of borehole passing through the reservoir.

In a refinement, the portion of the borehole passing through the reservoir deviates from vertical by at least 5°.

In another refinement, the casing is free of centralizers at least along the portion of the borehole that passes through the reservoir.

In another refinement, the NMR tool is a pad-type NMR tool and the antennas are disposed along the pad. Use of a pad-type tool results in the pad naturally following the path of the low side of the borehole and casing due to the offset center of gravity caused by the pad. The NMR tool may comprise a decentralizer that biases the antennas against the casing in radial alignment with the low side of the borehole, but the importance of such a decentralizer is lessened if a pad-type device is employed.

In another refinement, the method further comprises: carrying out an enhanced oil recovery (EOR) process on the reservoir prior to generating the first D values, waiting a time period during which the EOR process continues to be carried out, passing the nuclear magnetic resonance (NMR) tool through the reservoir a second time, and generating a series of second D values of the reservoir.

In another refinement, the generating of the second D values comprises comparing the first and second D values or subtracting the first D values from the second more-recent D values and generating a time-lapse D log for the portion of the borehole passing through the reservoir.

In another refinement, the method further comprises: generating a first D log from on the first D values and associated depths and generating a second D log derived from the second D values and associated depths and presenting the first and second D logs in a side-by-side fashion.

In another refinement, the method further comprises: calculating changes in saturations of one or more fluids in the reservoir based upon differences in the first and second D values. The one or more fluids including free gas, dissolved gas, oil, and water.

In another refinement, the NMR tool provides a plurality of depths of investigation (DOI) including a shallow DOI that is at least 2.7 inches from an outer surface of the NMR tool and in alignment with the antennas.

A method of drilling an observation well in through a reservoir undergoing an enhanced oil recovery (EOR) process is disclosed, which comprises: drilling a borehole through the reservoir at a deviation of at least 5° from vertical as the borehole passes through the reservoir to provide a low side of the borehole, running casing into the borehole wherein at least a portion of the casing disposed in the reservoir is non-conductive, non-magnetic and non-centralized, and wherein the non-conductive, non-magnetic and non-centralized portion of the casing rests against the low side of the borehole.

In another series of embodiments, NMR tools can be used in holes cased with non-magnetic and non-conductive casing or where the completion hardware (casing, sand control screen, etc.) is non-conductive and non-magnetic. In these situations, an NMR tool can be used to: monitor the setting process of cement; determine the mud displacement efficiency; determine the presence of a micro annulus and annular fluid composition at the casing-cement interface and the cement-formation interface; determine the presence of any mud cake on the well bore wall; determine physical properties of the set cement such as permeability and porosity; measure formation properties such as porosity, permeability, oil/water saturation.

Turning to FIG. 1, the pad-type NMR tool 10 is typically lowered into a borehole via a wireline 11. The wireline 11 is coupled to a logging head 12 and telemetry module 13. A decentralizer in the form of a bow spring 14 or retractable arm (not shown) may be included but is not necessary for practicing the disclosed methods, assuming a pad-type sonde 15 is utilized in combination with a deviated borehole 16 (FIG. 2). Additional details of the tool 10 can be obtained from U.S. Pat. No. 6,140,818 and literature regarding Schlumberger's MR Scanner™, proVision™ and CMR™ tools available at http://www.slb.com/content/services/evaluation/petrophysics/nmr/. Both the MR and CMR tools and associated software can generate real-time diffusivity values based on T1, $T_2$ or various statistical or weighted combinations of $T_1$ and/or $T_2$ based upon the antenna and DOI. (http://www.slb.com/modules/mnemonics/ProductItem.aspx?code=MRX_3DMAP_FLUIDS)

The sonde 15 includes a radially outwardly projecting pad 16 that includes a main antenna 17, high resolution antennas 18, 19 and a polarizing magnet (not shown) disposed within the pad 16. As shown in FIG. 1, the main antenna 17 provides a plurality of depths of investigation (DOI), four of which are shown at 21-24. A dead space 25 of about 2.7 inches is disposed between the outer surface of the main antenna 17 and the shallowest DOI 21. This dead space 25 in other applications is considered to be a liability but is exploited by the techniques disclosed herein.

Specifically, turning to FIG. 2, an observational borehole 26 is drilled in a deviated fashion or an angle with respect to vertical of about 5° or more, resulting in the borehole 26 having a low side 26a and a high side 26b. Non-conductive and non-magnetic casing 27 is run into the borehole 26. Because the borehole 26 is deviated, the casing 27 will rest along the low side 26a of the borehole 26 as shown in FIGS. 2 and 3. Further, because the center of gravity of the tool 10 is offset from a central longitudinal axis of the tool 10 towards the pad 16 due to the weight of the pad 16 and the magnet contained therein, the tool 10 will naturally rotate within the casing 26 so that the heavier pad 16 and antennas 17-19 will follow the path of the low side 26a of the borehole 26 and the circumferential segment of the casing 27 that is in radial alignment with the low side 26a of the borehole 26. Therefore, the decentralizer 14 is not mandatory but is merely optional. Of course, a decentralizer 14 may still be employed to ensure that the pad 16 of the tool 10 is biased against the inner surface of the casing 26 to facilitate accurate measurements in portions of the borehole 26 that are not sufficiently deviated or that are essentially vertical.

Turning to FIG. 3, because of the deviated borehole 26, with the casing 27 rests against the low side 26a of the borehole 26, and the DOIs 21-24 of the NMR tool 10 are all disposed in the formation 28 as opposed to in the annulus 29, casing 27 or cement. Thus, the inability of the NMR tool 10 to compensate for unknown or changing borehole fluids or poor cementation in the annulus 29 is irrelevant to the disclosed EOR evaluations because the pad 16 is biased against the casing 27 at the low side 26a of the borehole 26 resulting in the 2.7 inch dead zone 25 traversing the casing wall 26, the annulus 29 and part of the formation 28 as shown in FIG. 3. As a result, the DOIs 21-24 of the tool 10 are all disposed within the formation 28 and beyond casing 26 and annulus 29 as shown in FIG. 3. As a result, a conventional NMR tool 10 can be used in the cased hole 26 as long as the zone of interest is cased with non-conductive and non-magnetic (e.g., non-metallic) casing 27, examples of which are disclosed in U.S. Pat. Nos. 5,524,708 and 5,213,379. Fiberglass oil well casing meeting the requirements of API standard 15AR ("Fiberglass Casing and Tubing") is available from a number of suppliers including Star Fiber Glass (http://www.starfiberglass.com/downholet&c.html), Centron International Inc. of South Mineral Wells, Tex., USA (http://www.centrongre.com/product.html) and Fiberglass Well Systems of Austin, Tex. (http://www.fiberglasswellsystems.com/prodsuit.html). See also, ASTM STP 963.

Figure 5:
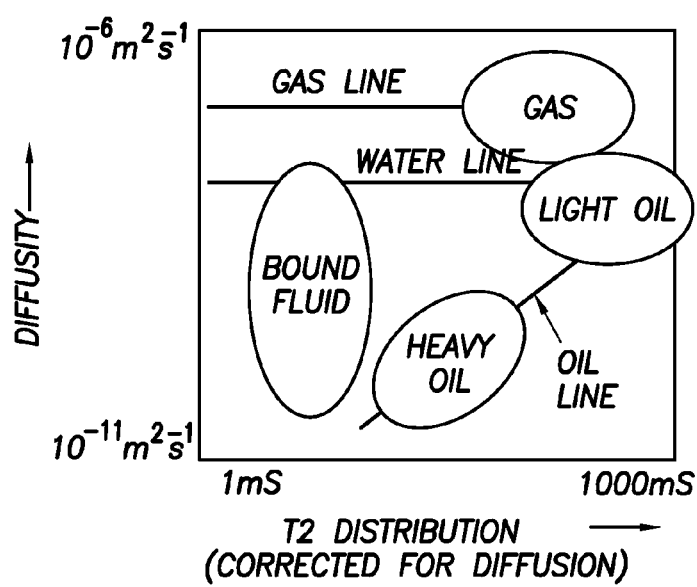
FIG. 5 is a diffusivity/relaxation map made in accordance with the disclosed methods.

Turning to FIG. 4, two diffusivity logs taken at two different times $t_1$ and $t_2$ (which may be months or years apart) are shown. As time elapsed between the initial log performed at $t_1$ and EOR efforts continued, the diffusivity at $t_2$ generally increased as oil was replaced with gas or chemical (e.g., alkaline surfactant polymer (ASP)). A diffusivity/relaxation time $t_2$ map is shown in FIG. 5, similar to those disclosed in U.S. Publication No. 2006/0122779, Lo et al, "Correlation of NMR Relaxation Time with Viscosity, Diffusivity and Gas/Oil Ratio of Methane/Hydrocarbon Mixtures," SPE (Society of Petroleum Engineers) Paper No. 63217 (2000), and Heaton, et al, "Applications of a New-Generation NMR Wireline Logging Tool," SPE Paper No. 77400 (2002). Software is available for use with both the CMR and MR tools that can generate the map of FIG. 5 and variations thereof.

A series of NMR experiments have been performed on oils livened with methane at varying gas/oil ratios (GOR) and pressure to examine the effect on T2-Diffusion MRF (magnetic resonance fluid characterization) maps. The results compare favorably to models based on Stokes-Einstein and MRF field data.

Time-lapse $T_2$ processing of NMR data gives an independent measure of oil and gas saturation, not just the oil saturation. Using the techniques disclosed herein, it is possible to distinguish dissolved gas from free gas because the diffusivity is dependent on the immediate environment of a molecule as well as the diameter of the molecule. As a result, it is possible to measure the saturations of these two gas states independently using $DT_2$ data, which is very useful for miscible gas flood monitoring. Specifically, the arrival of free gas at the observation well can be detected after the bank of miscible gas has migrated elsewhere. Therefore, the disclosed logging techniques repeated in an observation well near an injector will determine the arrival time and width of the miscible gas bank, the associated oil de-saturation, and the further oil de-saturation that may occur in the free gas that follows the miscible gas bank.

While this disclosure is directed primarily to EOR monitoring, other uses of NMR imaging in cased or completed wells is envisioned. For example, when the non-magnetic, non-conductive casing is centralized, a rotating NMR tool can be used to monitor the casing-cement interface, the cement-formation interface and the cement setting process. NMR imaging behind other non-conductive and non-magnetic completion hardware such as the slotted liners, prepacked screens, sand control screens, etc. that are non-conductive and non-metallic is also possible. Imaging behind such completions may provide details on the quality of gravel packing and changes that may occur in the gravel pack permeability/porosity due to improper sand control and damage from the residual mud/mud cake, formation properties and fluids in the formation.

Figure 6:
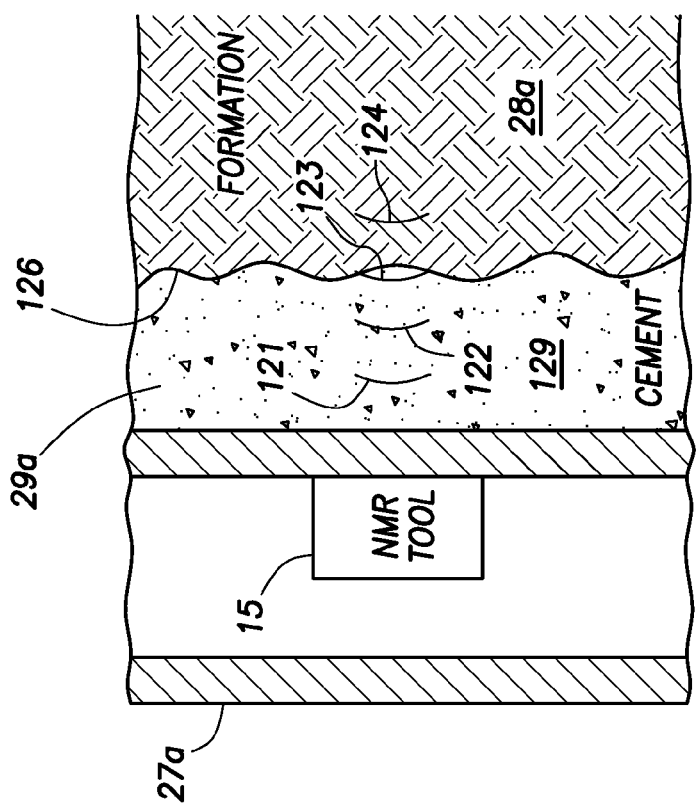
FIG. 6 schematically illustrates a disclosed method of NMR imaging behind a non-conductive, non-metallic and cemented casing.

For example, FIG. 6 shows a cemented borehole 126 having a non-conventional casing 27a that is non-conductive and non-metallic. Preferably, the casing material properties are selected carefully to ensure that the pulse RF signals are not attenuated. The casing 27a is then lowered into the section of the borehole 126 that requires cementing. The annular space 29a around the casing 27a is then filled with cement as shown using conventional procedures. Specifically, a series of fluids comprising of a spacer, wash fluid and cement are pumped down the inside of the casing 27a to subsequently displace the mud from the annulus 29a. The cement in the annulus 29a is allowed to set. The NMR tool 15 is then lowered inside the casing 27a that is filled with mud or completion brine. Various depths of investigation are shown schematically at 121-124. The NMR log can be used to: monitor the setting process of cement; determine the mud displacement efficiency; determine the presence of micro annulus and composition of fluid at the casing-cement interface and/or the cement-formation interface; determine the presence of any mud cake on the borehole wall; determine physical properties of the set cement 129 such as permeability and/or porosity; measure formation 28a properties such as porosity, permeability, and/ or oil/water saturation.

The combined use of non-conventional casing 27a and an NMR tool 15 will allow imaging of a cased hole 126 that is cemented. Using such a method to image behind the casing eliminates the need to perforate the casing 27a and obtain formation cores thus saving time and money. As noted above, the use of steel casing does not allow the use of NMR imaging behind the casing.

Figure 7:
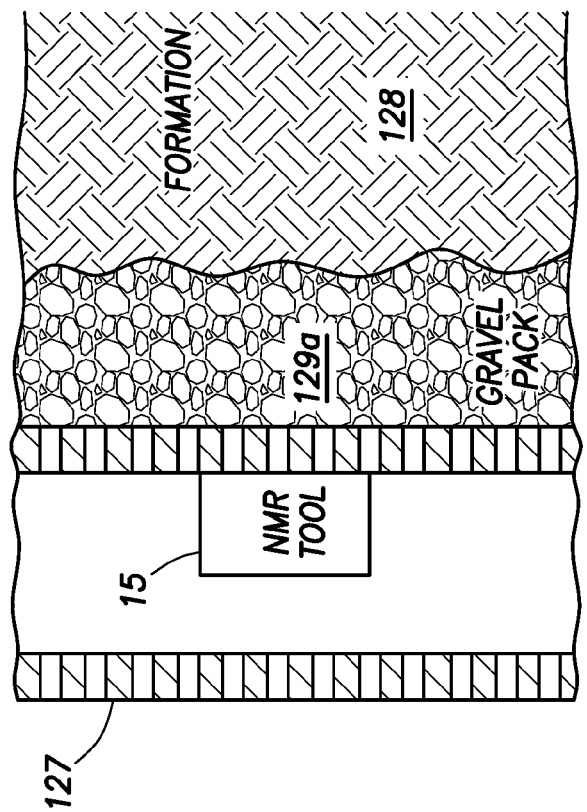
FIG. 7 schematically illustrates a disclosed method of NMR imaging behind a non-conductive, non-metallic screen of a sand control completion.

FIG. 7 shows a non-conductive and non-metallic sand control screen 127 with gravel packed between the screen 127 and the formation 128. An NMR tool 15 lowered inside the screen 127 is then used to monitor the quality of the gravel pack over time. The NMR logs will help in determining the porosity/permeability of the gravel pack 129a, formation properties and formation fluids. NMR logs will also help in monitoring effective treatment and stimulation of the well.

While only certain embodiments have been set forth, alternatives and modifications will be apparent from the above description to those skilled in the art. These and other alternatives are considered equivalents and within the scope of this disclosure and the appended claims.

What is claimed is:

1. A method of determining a nuclear magnetic resonance (NMR) property of a formation, comprising:
   providing a borehole, at least a portion of which is cased with non-magnetic and non-conductive casing, passing through the formation;
   disposing a NMR tool in the borehole;
   generating a series of NMR measurements along the borehole; and
   determining the NMR property using the series of NMR measurements.

2. The method of claim 1, wherein the generating of the series of NMR measurements comprises using different echo spacings, different wait times, different frequencies, different pulse sequences, or a combination of those.

3. The method of claim 1, wherein the NMR property of the formation includes porosity, fluid saturation, permeability, fluid diffusion, fluid viscosity, fluid hydrogen index, transverse relaxation time, and longitudinal relaxation time.

4. The method of claim 3, further comprising making a multidimensional plot using two or more of the NMR properties.

5. The method of claim 1, wherein the casing is plastic or fiber-reinforced plastic.

6. The method of claim 1, wherein the NMR tool is a pad-type NMR tool.

7. The method of claim 1, further comprising biasing the NMR tool against the casing.

8. The method of claim 1, further comprising using the determined NMR property to perform at least one task selected from the group consisting of:
   monitoring a setting up of cement;
   determining a mud displacement efficiency;
   detecting a micro annulus between the casing and the cement;
   detecting a micro annulus between the cement and the formation;
   detecting a fluid composition at a casing-cement interface;
   detecting a fluid composition at a cement-formation interface;
   determining a presence of mud cake on a borehole wall;
   determining cement porosity;
   determining cement permeability;
   measuring formation porosity;
   measuring formation permeability;
   measuring oil saturation; and
   measuring water saturation.

9. The method of claim 8, further comprising:
   waiting a predetermined amount of time,
   generating a second series of NMR measurements,
   determining the NMR property using the second series of measurements; and
   using the determined NMR property values to evaluate changes in at least one parameter selected from the group consisting of:
   fluid composition at the casing-cement interface;
   fluid composition at the cement-formation interface;
   presence of mud cake on the borehole wall;
   cement porosity;
   cement permeability;
   formation porosity;
   formation permeability;
   oil saturation; and
   water saturation.

10. The method of claim 1, wherein the borehole deviates from the vertical by at least five degrees.

11. A method of determining a nuclear magnetic resonance (NMR) property of a formation, comprising:
- providing a borehole, at least a portion of which is cased with non-magnetic and non-conductive casing, passing through the formation, wherein the non-magnetic and non-conductive casing is eccentered in the borehole;
- disposing a NMR tool in the borehole;
- generating a first series of NMR measurements along the borehole;
- waiting for a selected period of time;
- generating a second series of NMR measurements along the borehole;
- determining the NMR property using the first series of NMR measurements; and
- determining the NMR property using the second series of NMR measurements.

12. The method of claim 11, further comprising:
- using the determined NMR property values to evaluate changes in at least one parameter selected from the group consisting of:
- fluid composition at the casing-cement interface;
- fluid composition at the cement-formation interface;
- presence of mud cake on the borehole wall;
- cement porosity;
- cement permeability;
- formation porosity;
- formation permeability;
- oil saturation; and
- water saturation.

13. The method of claim 11, further comprising using the determined NMR property to perform at least one task selected from the group consisting of:
- monitoring a setting up of cement;
- determining a mud displacement efficiency;
- detecting a micro annulus between the casing and the cement;
- detecting a micro annulus between the cement and the formation;
- detecting a fluid composition at a casing-cement interface;
- detecting a fluid composition at a cement-formation interface;
- determining a presence of mud cake on a borehole wall;
- determining cement porosity;
- determining cement permeability;
- measuring formation porosity;
- measuring formation permeability;
- measuring oil saturation; and
- measuring water saturation.

* * * * *